United States Patent
Grossetie et al.

(10) Patent No.: US 6,621,605 B1
(45) Date of Patent: Sep. 16, 2003

(54) COMPUTER-ASSISTED METHOD AND DEVICE FOR RESTORING THREE-DIMENSIONAL IMAGES

(75) Inventors: Jean-Claude Grossetie, Ispra (IT); Pierre Noirard, Lipsheim (FR)

(73) Assignee: European Community (EC), Luxembourg (LU)

( * ) Notice: Subject to any disclaimer, the term of this patent is extended or adjusted under 35 U.S.C. 154(b) by 0 days.

(21) Appl. No.: 09/856,482
(22) PCT Filed: Dec. 8, 1999
(86) PCT No.: PCT/EP99/09664
§ 371 (c)(1),
(2), (4) Date: Jun. 11, 2001
(87) PCT Pub. No.: WO00/34834
PCT Pub. Date: Jun. 15, 2000

(30) Foreign Application Priority Data

Dec. 9, 1998 (EP) .............................. 98403111

(51) Int. Cl.[7] .................................. G03H 1/08
(52) U.S. Cl. .............................. 359/9; 359/22
(58) Field of Search ................. 359/9, 21, 22

(56) References Cited

U.S. PATENT DOCUMENTS

| 3,614,426 A | | 10/1971 | Donzelle ...................... 378/23 |
| 5,400,155 A | * | 3/1995 | Ueda et al. ..................... 359/9 |
| 5,594,564 A | * | 1/1997 | Ishimoto et al. ............. 349/143 |
| 5,668,648 A | | 9/1997 | Saito et al. ..................... 359/9 |

FOREIGN PATENT DOCUMENTS

| EP | 0589558 | 3/1994 |
| EP | 0590913 | 4/1994 |
| JP | 09244520 | 9/1997 |

* cited by examiner

*Primary Examiner*—Mark A. Robinson
*Assistant Examiner*—Alessandro V. Amari
(74) *Attorney, Agent, or Firm*—Bacon & Thomas, PLLC

(57) ABSTRACT

A three-dimensional image is stored (E0) in a computer memory in the form of digital data and defined in a three-dimensional geometrical space. Two-dimensional images are calculated (E1) by determining, in the three-dimensional geometrical space, the intersections between the three-dimensional image and a plurality of parallel section planes. Respective holograms are calculated (E2) for the two-dimensional images, and are then reproduced (E3) sequentially on a spatial light modulator illuminated by a coherent light source. A transparent three-dimensional image is thus reproduced.

51 Claims, 5 Drawing Sheets

COMPUTER-ASSISTED METHOD AND DEVICE FOR RESTORING THREE-DIMENSIONAL IMAGES

BACKGROUND OF THE INVENTION

The present invention relates generally to reproducing images in three dimensions and more particularly to synthesizing holograms digitally and reproducing images in three dimensions from those holograms.

Several techniques for reproducing images in three dimensions are known in the art.

Some systems, referred to as "stereoscopic", produce two offset images of the same scene, each of which is viewed by a respective eye of an observer. Depth of field and volume are then reconstructed by the brain of the observer. The majority of such systems necessitate the wearing of bulky accessories such as glasses or helmets to separate and differentiate the images sent to each eye. Also, they present only one angle of binocular vision of the scene to be represented.

Another technique, referred to as "autostereoscopic", consists in one particular instance in taking a photograph of a scene through a plane array of sufficiently small lenses, so as to associate each lens with a respective point of view of the photographed scene. The photograph obtained in this way gives the illusion of relief, but produces a limited effect of depth. This method does not conform to the natural accommodation of the eye, and in the current state of the art, reproducing three-dimensional images in real-time by this method is difficult.

Holography is the most faithful method of reproducing three-dimensional images because it reproduces the optical field generated by the scene. In particular, this method conforms perfectly to the accommodation of the eye. Analogue holography consists in projecting a coherent light wave emitted by a laser onto an object, picking up from this wave a light wave diffused by the object, and causing the diffused light wave to interfere with a reference wave consisting of another part of the beam emitted by the laser to produce an interference field. The interference field is recorded in a photosensitive medium such as a photographic plate. An image of the original scene in three dimensions can then be observed by illuminating the photographic plate with a coherent wave. This purely analogue method provides excellent reproduction quality but cannot reproduce three-dimensional images in real time.

Digital holographic methods of producing three-dimensional images in real time are known in the art. U.S. Pat. No. 5,668,648 describes a computer-assisted holographic apparatus capable of digitally synthesizing the hologram of a virtual object and reproducing an image from that hologram. The virtual object is sampled into sampling points which are considered as individual spherical light sources. Respective diffraction fields are calculated for the sampling points and are then superposed. An interpolation technique is used to improve the resolution of the resulting diffraction field. An interference field (hologram) is then generated as a function of the resulting diffraction field and data representing a reference wave and is physically reproduced by a spatial light modulator.

Synthesizing holograms digitally by the above method necessitates long and complex calculations, in particular to determine a diffraction field associated with each sampling point of the object and to interpolate the resulting diffraction field.

SUMMARY OF THE INVENTION

The present invention aims to provide a holographic method that is capable of efficient spatial reproduction of three-dimensional images in real time.

To this end, there is provided a method of reproducing at least a portion of a three-dimensional image, said three-dimensional image being represented by digital data and defined in a three-dimensional geometrical space, which method is characterized in that it comprises the following steps:

calculating a set of two-dimensional images obtained by determining, in the three-dimensional geometrical space, respective intersections between the three-dimensional image and a plurality of section planes, calculating a hologram for each of the two-dimensional images, and successively reproducing the holograms of the two-dimensional images on a spatial light modulator illuminated by a light source.

The present invention finds a particularly suitable application in the medical field. The three-dimensional image reproduced by the above method is transparent, enabling the interior of organs to be visualized. Other applications can be envisaged, however, especially in the fields of consumer imaging (TV, cinema), and telecommunications.

The light source is typically a spatially coherent monochromatic light source emitting at a predetermined wavelength and the holograms of the two-dimensional images are calculated for said wavelength.

The spatial light modulator is advantageously a liquid crystal screen having a pixel pitch of less than 10 $\mu$m and preferably close to 1 $\mu$m in at least two different directions. By "pixel pitch" is meant the period of reproduction of pixels in a given direction, which, for each pixel, corresponds to the sum of the size of the pixel in the given direction plus the distance separating that pixel from an adjacent pixel in the same direction. The distance between two pixels is chosen to be as small as possible and preferably substantially zero. The above-mentioned two different directions respectively correspond to rows and columns of pixels on the liquid crystal screen.

In order to reproduce the three-dimensional image faithfully, the section planes are preferably parallel.

Said step of successively reproducing the holograms consists in repetitively reproducing on the spatial light modulator a sequence consisting of the holograms. The sequence advantageously has a duration not exceeding 50 ms, so that an observer can effortlessly view the image in three dimensions by mental fusion.

In the invention, in said step of calculating a hologram for each of the two-dimensional images, the holograms of the two-dimensional images are calculated in a predetermined plane situated at a finite distance from the plurality of section planes and preferably parallel thereto. This conforms perfectly to the geometry and the proportions of the three-dimensional image and prevents it being reproduced in a deformed ("crushed") fashion.

The two-dimensional images are typically defined by respective real functions and said step of calculating a hologram for each of the two-dimensional images comprises the following steps for a given two-dimensional image:

transforming the given two-dimensional image defined by the corresponding real function into a complex two-dimensional image defined by a complex function, oversampling the complex image, simulating the production of a diffracted image resulting from the diffraction of a light wave by the oversampled complex image, adding a complex field representing a reference light wave to the resulting diffracted image, and coding values taken by the amplitude of the sum of said complex field and the resulting diffracted image to produce the hologram associated with said given two-dimensional image.

Said simulation step advantageously consists in calculating a convolution product, associated with the oversampled complex image, of two components, by applying the transform which is the inverse of a predetermined complex transform to the product of the respective complex transforms of said two components. The predetermined complex transform is, for example, one of the following complex transforms: Fourier transform, Walsh transform, Hankel transform, orthogonal polynomial transform, Hadamar transform, Karhunen-Loeve transform, multiresolution discrete wavelet transform, adaptive wavelet transform, and a transform resulting from composing two or more of the above transforms.

The three-dimensional image can be a color image. In this case, the method of the invention further comprises a step of decomposing each of the two-dimensional images into red, green, and blue (RGB) two-dimensional images respectively, said step of calculating a hologram for each of the two-dimensional images consisting, for a given red, green, or blue two-dimensional image, in producing a hologram for a wavelength corresponding to the color of the given two-dimensional image, and said step of successively reproducing the holograms consisting in reproducing the holograms of the two-dimensional images successively on the spatial light modulator while the latter is illuminated in turn by coherent red, green, and blue light waves respectively as a function of the color for which the hologram reproduced on the spatial light modulator was calculated.

The invention also provides a method of reproducing, in three dimensions, a video film consisting of a sequence of three-dimensional images represented by digital data, characterized in that the method consists in applying the above-defined method to each three-dimensional image of said sequence so that, for each three-dimensional image, holograms corresponding to that image are reproduced successively on a spatial light modulator during a predetermined image cycle.

The invention further provides an apparatus for reproducing at least a portion of a three-dimensional image, said three-dimensional image being represented by digital data and defined in a three-dimensional geometrical space, which apparatus is characterized in that it comprises:

means for storing the three-dimensional image,
means for calculating a set of two-dimensional images obtained by determining in the three-dimensional geometrical space respective intersections between the three-dimensional image and a plurality of section planes, means for calculating a hologram for each of the two-dimensional images, a spatial light modulator for successively reproducing the holograms of the two-dimensional images, and a light source for illuminating the spatial light modulator during the reproduction thereby of said holograms.

Said means for calculating a hologram for each of the two-dimensional images typically comprise means for calculating the holograms of the two-dimensional images in a predetermined plane situated at a finite distance from the plurality of section planes and preferably parallel thereto.

To be more precise, said means for calculating a hologram for each of the two-dimensional images comprise:

means for transforming a given two-dimensional image defined by the corresponding real function into a complex two-dimensional image defined by a complex function, means for oversampling the complex image, means for simulating the production of a diffracted image resulting from the diffraction of a light wave by the oversampled complex image, means for adding a complex field representing a reference light wave to the resulting diffracted image, and means for coding values taken by the amplitude of the sum of said complex field and the resulting diffracted image to produce the hologram associated with said given two-dimensional image.

Said means for simulating the production of a diffracted image can comprise means for calculating a convolution product, associated with the oversampled complex image, of two components, by applying the transform which is the inverse of a predetermined complex transform to the product of the respective complex transforms of said two components.

When the three-dimensional image is a color image, the apparatus of the invention further comprises means for decomposing each of the two-dimensional images into red, green, and blue (RGB) two-dimensional images respectively, said means for calculating a hologram for each of the two-dimensional images then comprising means for producing, for a given red, green, or blue two-dimensional image, a hologram for a wavelength corresponding to the color of the given two-dimensional image, and the spatial light modulator reproducing the holograms of the two-dimensional images successively while it is illuminated in turn by light sources emitting coherent red, green, and blue light waves respectively as a function of the color for which the hologram reproduced on the spatial light modulator was calculated.

The present invention also provides an apparatus for reproducing, in three dimensions, a video film consisting of a sequence of three-dimensional images represented by digital data, characterized in that it comprises means for applying each three-dimensional image of said sequence to the above-defined apparatus so that, for each three-dimensional image, holograms corresponding to that image are reproduced on a spatial light modulator during a predetermined image cycle.

Other features and advantages of the present invention will become apparent on reading the following detailed description, which is given with reference to the accompanying drawings, in which:

DESCRIPTION OF THE INVENTION

DESCRIPTION OF THE INVENTION

Figure 1:
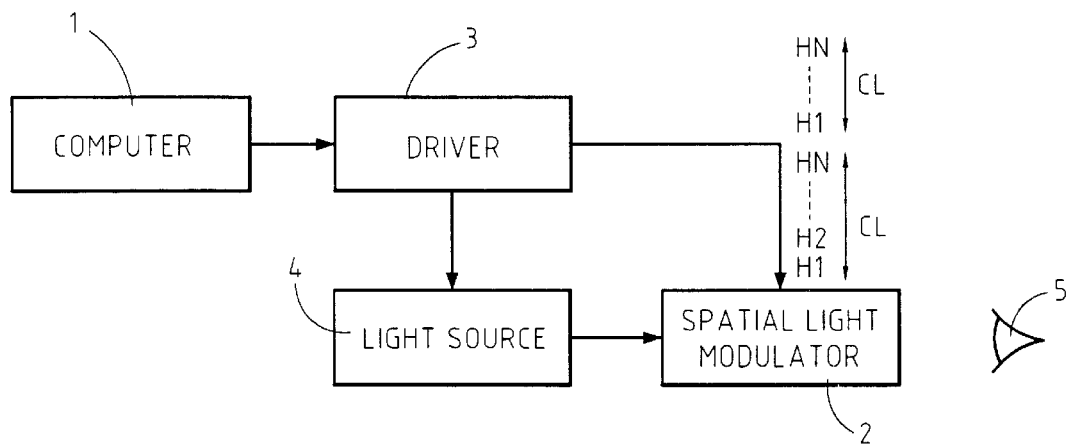
FIG. 1 is a block diagram of a first embodiment of a holographic apparatus of the invention.

Referring to FIG. 1, a holographic apparatus according to a first embodiment of the invention comprises a computer 1, a spatial light modulator 2, a driver interface 3 for controlling the spatial light modulator 2 as a function of signals transmitted by the computer 1, and a light source 4, which can be controlled by the driver interface 3.

The computer 1 holds in a memory (not shown) digital data representing a three-dimensional image. In the remainder of the description, the term "three-dimensional image" will be used to refer to a virtual three-dimensional scene (i.e. a scene represented by data), representing one or more objects or elements. The above-mentioned digital data comprises, for example, a set of triplets of coordinates which, in a three-dimensional spatial system of axes, define the position of each point of the various objects or elements constituting the three-dimensional image. Each triplet is associated with an intensity or a gray level. For realistic viewing, it is desirable to add the thermo-optical characteristics of the material constituting the object in question. All of the above data constitutes the phenomenological coordinates of the point. The digital data preferably also includes volume information. In particular, each object or element of the three-dimensional image is represented by points situated on the surface of the object and by points inside the object. The digital data representing the three-dimensional image is typically obtained in a conventional way by computer-assisted design (CAD) or by volume synthesis using a three-dimensional geometrical modeller associated either with a ray launching method or a radiosity method, or any other three-dimensional acquisition method.

The computer 1 also holds in memory an algorithm for generating holograms, described later with reference to FIGS. 2 to 7, for producing a sequence of digital holograms associated with the three-dimensional image. The computer 1 controls the spatial light modulator 2 via the driver 3 so that the sequence of holograms generated digitally by the computer 1 is reproduced physically by the spatial modulator 2.

The light source 4 is a spatially coherent monochromatic source capable of emitting coherent light at a predetermined wavelength λ, such as a laser or a white light source associated with a dichroic or interference filter. The coherence length of the light source 4 is predefined as a function of the characteristic dimensions of the spatial light modulator 2, in a manner that is known to the skilled person.

The spatial modulator 2 comprises an array of diffractive cells which are controlled to reproduce physically the above-mentioned sequence of digital holograms and which diffract the light emitted by the light source 4 so that an observer 5 in front of the spatial modulator 2 can observe a three-dimensional image by virtue of holographic reconstruction.

The spatial light modulator 2, referred to also as a "holographic screen" in the particular application of holography, is a liquid crystal screen, for example, whose states allow either absorption modulation or optical path modulation, and whose pixel pitch p in the horizontal and vertical directions is less than 10 μm and preferably close to 1 μm. The pixel pitch p in the horizontal or vertical direction is defined as the sum of the size of a given pixel in that direction plus the distance between the given pixel and an adjacent pixel in the same direction.

In the embodiment shown in FIG. 1, the light source 4 is disposed to illuminate the spatial modulator 2 by transmission. As an alternative to this, however, the light source 4 can be placed on the same side of the spatial modulator 2 as the observer 5 and the spatial modulator 2 can be adapted so that the light emitted by the source 4 is diffracted by reflection.

Figure 2:
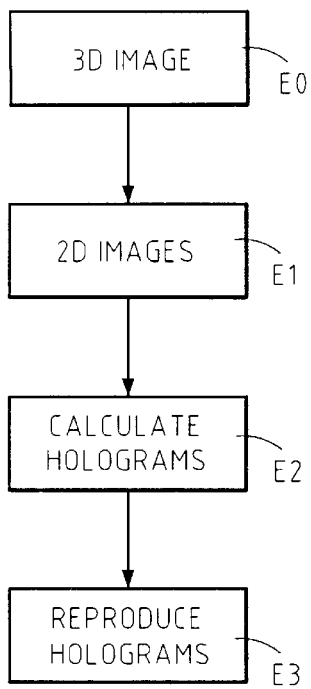
FIG. 2 is a flowchart of an algorithm implemented by the apparatus shown in FIG. 1.

FIGS. 2 to 8 show a method of reproducing images in three dimensions in accordance with the invention. In particular, FIG. 2 shows an algorithm partly implemented by the computer 1 shown in FIG. 1.

Figure 3:
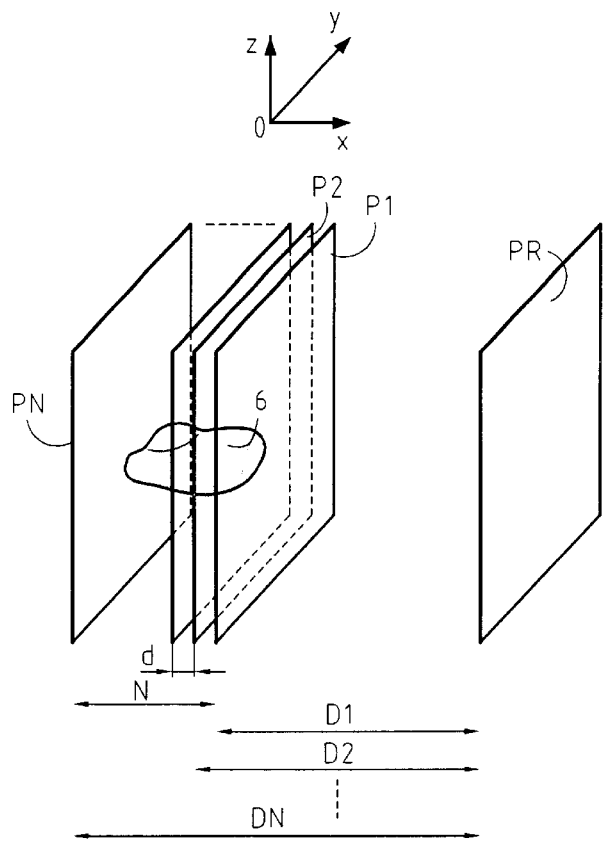
FIG. 3 is a diagram showing decomposition of a three-dimensional image into two-dimensional images by the algorithm shown in FIG. 2.
Figure 4:
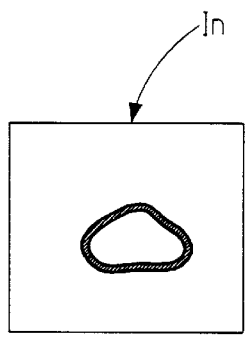
FIG. 4 is a diagram showing a two-dimensional image obtained after the process of decomposing the three-dimensional image shown in FIG. 3.

In a preliminary step E0 of the algorithm, a three-dimensional image is stored in the form of digital data in a memory of the computer 1. The three-dimensional image is typically defined, as previously described, by the coordinates in a three-dimensional system of axes (O,x,y,z) of representative points of the interior and of the external surface of each object or element contained in the image, and by the phenomenological coordinates of those points. FIG. 3 shows, by way of example only and with the aim of simplification, a three-dimensional image 6 in which only one object is represented.

In a first step E1 an integer number N greater than 1 of parallel (or substantially parallel) section planes P1 to PN are defined in the three-dimensional system of axes (O,x,y,z). The section planes P1 to PN are selected so that they have a non-empty intersection with the three-dimensional image 6. The distance d between two given section planes can vary. For example, if it is desired to reproduce certain areas of the image 6 with greater precision, a greater number of section planes can be defined in those areas. A reference plane PR (also referred to as the hologram calculation plane) is also defined. The reference plane PR is parallel to the section planes P1 to PN. It can be separate from the three-dimensional image 6 or it can intersect it. Its function will be explained later.

In step E2, calculation is then performed to determine the respective intersections between the planes P1 to PN and the three-dimensional image 6. These intersections define two-dimensional images I1 to IN, one of which is shown diagrammatically in FIG. 4. Each two-dimensional image In, where n is an integer from 1 to N, is made up of points of the three-dimensional image 6 that are included in the corresponding section plane Pn, and is described by a real two-dimensional distribution of intensities fn (y, z) which indicates a level of gray for each point (y, z) in the plane Pn. Step E1 can thus be regarded as similar to decomposing the three-dimensional image 6 into a plurality of sections I1 to IN.

In a second step E2 of the algorithm the computer 1 calculates, for each two-dimensional image or section I1 to IN obtained in step E1, and in the reference plane PR, a hologram H1 to HN associated with this image. The skilled person knows methods based on the Fourier transform for producing a hologram digitally from a given two-dimensional image. However, for the most part, those methods are only capable of generating holograms at an infinite distance from the two-dimensional image. The present invention uses an algorithm representing an improvement over the conventional methods to implement step E2. Step E2 aims to calculate a hologram Hn for each two-dimensional image In precisely in the reference plane PR, i.e. allowing for the distance Dn between the image In (or the plane Pn) and the reference plane PR. Step E2 in accordance with the invention is shown in detail in FIG. 5 in the form of sub-steps E20 to E25.

In sub-step E20 each two-dimensional image In described by the above-mentioned distribution of intensities fn (y, z) is transformed into a transformed two-dimensional image I1n which is described by a distribution of amplitudes by calculating for each point of the image In the square root of the corresponding intensity value.

In the next sub-step E21 a "pseudorandom" diffuser is generated digitally. The diffuser consists of an "image" having the same number of pixels as the two-dimensional image In and each pixel of which has an intensity value equal to 1 and a random phase. Each phase of the diffuser is then associated with a corresponding pixel of the transformed two-dimensional image I1n to transform the image I1n into a "complex" image I2n in which a complex number defined by an amplitude value and a phase value is determined for each pixel. Among other things, the pseudorandom diffuser prevents the resulting hologram Hn from having too many amplitude level disparities by averaging the amplitude values of the hologram.

Figure 6:
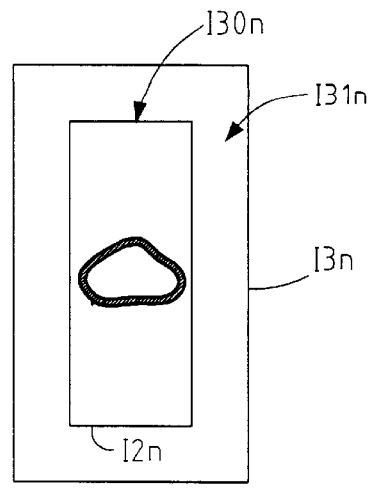
FIG. 6 is a diagram showing oversampling of a two-dimensional image by the algorithm shown in FIG. 5.
Figure 7:
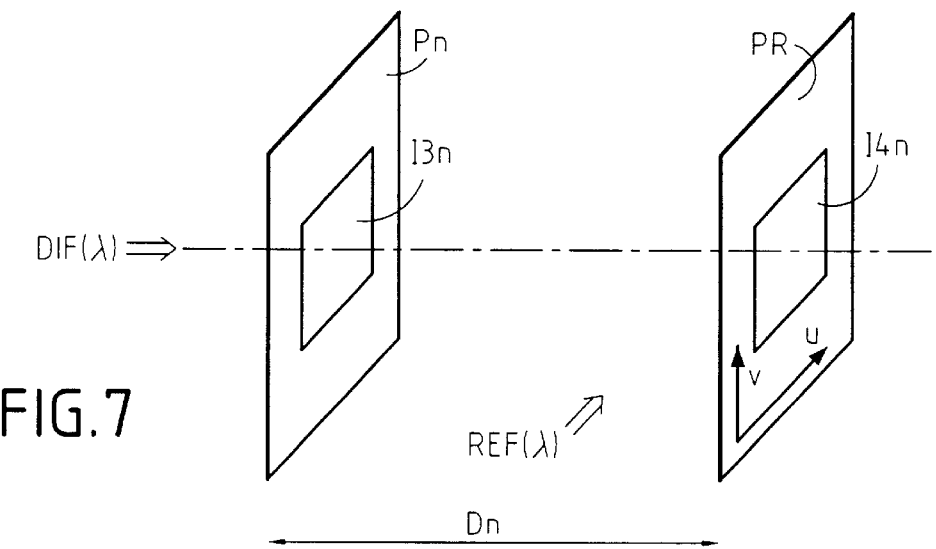
FIG. 7 shows the simulation of a diffracted image from a two-dimensional image.

In sub-step E22 the complex image I2n obtained in sub-step E21 is oversampled, i.e. included in a larger image, as shown in FIG. 6. An image I3n is thus formed, consisting in a central part I30n of the complex image I2n and in a complementary peripheral part I31n of pixels whose amplitude is chosen arbitrarily, for example equal to 0. Oversampling the complex image I2n makes it possible to increase the number of pixels in the resulting hologram Hn and thus to reproduce a three-dimensional image with greater resolution.

In sub-step E23 the diffracted image produced on the hologram calculation plane PR when the two-image I3n is illuminated by a fictitious coherent wave DIF whose wavelength is the predetermined wavelength λ (cf. FIG. 7) is simulated digitally. Sub-step E23 consists in calculating a convolution product associated with the oversampled complex image I3n. The convolution product conforms to the theory of scalar diffraction. For example, using a Rayleigh-Sommerfeld formulation of scalar diffraction, the two components of the convolution product can respectively correspond to a complex field representing the oversampled complex image I3n and to a complex field representing a spherical light wave of wavelength λ. Other types of convolution product for calculating a diffracted image are known to the skilled person, however. The convolution product calculated in sub-step E23 uses parameters including the above-mentioned distance Dn and the wavelength λ.

In accordance with the invention, the convolution product is calculated by applying a complex transformation, also referred to as a complex fast transformation, to the two components of the convolution product, calculating the product of the resulting complex fast transforms, and then applying the complex fast transform that is the inverse of said complex fast transform to the above-mentioned product of the complex fast transforms.

To be more explicit, if CONV designates the convolution product, C1 and C2 the two components thereof, and T the complex fast transform, then the convolution product is written:

$$CONV = C1 \otimes C2 = T^{-1}T(C1 \otimes C2)$$

$$CONV = T^{-1}(T(C1)T(C2))$$

In this context the expression "complex fast transform" means a mathematical transform compatible with the theory of scalar optical diffraction, i.e. whose resulting transformed functions satisfy the conventional scalar diffraction equations. The complex fast transform must also satisfy the property whereby the complex fast transform of a convolution product of two components is equal to the product of the respective complex fast transforms of said two components. Complex fast transforms that satisfy the above conditions include the Fourier transform, the orthogonal polynomial transform, the Paley transform, the Hadamar transform, the Walsh transform, the Hankel transform, the Karhunen-Loeve transform, the multiresolution discrete wavelet transform and the adaptive wavelet transform. Other appropriate complex fast transforms include those resulting from composing two or more of the above-mentioned transforms, such as the Walsh transform and the Hadamar transform. The application of a composition of two given transforms T1 and T2 to any image I is defined in conventional mathematical terms as follows: (T1oT2)(I)=T1(T2(I)).

Each of the above-mentioned complex fast transforms can be used in a specific case. In particular, the complex fast transform is chosen as a function of the distance Dn. For a distance Dn that is long, a Fourier transform is appropriate. For a shorter distance Dn a Walsh transform is more suitable. Also, it has been found that using a complex fast transform from the above-mentioned complex fast transforms other than the Fourier transform gives better results in terms of the quality of the hologram Hn than those obtained using the Fourier transform.

The technique of calculating the convolution product as described above simplifies the calculations and avoids the conventional approximation of assigning an infinite value to the distance between the two-dimensional image and the hologram calculation plane.

Note also that transforming the two-dimensional image In into a complex image I2n facilitates calculating the diffracted image in sub-step E23 because the complex fast transform is applied directly to an image I3n described by a complex function and not to an image described by a real function.

At the end of sub-step E23 the diffracted image, referenced I4n, is described by a complex field consisting of a set of complex numbers each of which is associated with a point of the image I4n. Each of the complex numbers also depends on the image I3n as a whole.

In the next sub-step E24 a complex field simulating a reference light wave REF of wavelength λ directed towards the hologram calculation plane PR is added in the plane PR to the complex field representing the diffracted image I4n (see FIG. 7), after which the amplitude information contained in the resulting complex field is extracted in order to produce an interference field. The addition of the above-mentioned two complex fields is carried out by adding at each point of the diffracted image I4n the complex number associated with that point and the value, at the same point, of the complex field representing the reference wave REF. Said interference field constitutes a hologram Hn' of the two-dimensional image In.

The hologram Hn' of a given two-dimensional image In obtained in sub-step E24 is a diffractive field or grating which is calculated for a particular wavelength, namely the emission wavelength λ of the light source 4. This hologram, which is in a virtual form in sub-step E24, i.e. is represented in the computer 1 by digital data, is such that, if it is reproduced physically by a holographic screen, illuminating said holographic screen with a light source emitting at the above-mentioned wavelength λ enables reproduction of the original two-dimensional image In in a given order of diffraction.

Each hologram Hn' obtained in sub-step E24 is described digitally in the computer 1 by a two-dimensional amplitude function An (u, v) where (u, v) are coordinates in the hologram calculation plane PR which correspond, for example, to image spatial frequencies if the complex fast transform chosen in sub-step E23 is a Fourier transform. As explained above, the two-dimensional amplitude function An(u, v) is deduced from the two-dimensional intensity function fn (y, z) describing the corresponding two-dimensional image In. In practice, the function An(u, v) associated with a given hologram Hn' is calculated only for a series of discrete points $(u, v) = (u_n^k, v_n^q)$ where $\underline{k}$ and $q$ are integers. However, the values taken by the functions An(u, v) can spread continuously from a minimum amplitude value to a maximum amplitude value.

In sub-step E25 the holograms Hn (n=1 to N) are obtained by quantizing and coding the values taken by the functions An(u, v), i.e. by associating with each value of those functions a discrete value which is coded digitally, for example on eight bits. Each pair of discrete points $(u_n^k, v_n^q)$ then corresponds to a discrete amplitude value representing one of 256 gray levels. The amplitudes An (u, v) can equally be quantized more simply by associating with each amplitude value of An (u, v) either the discrete value "0" if said amplitude value is below a predetermined threshold or the discrete value "1" if said amplitude value is above the predetermined threshold.

Figure 5:
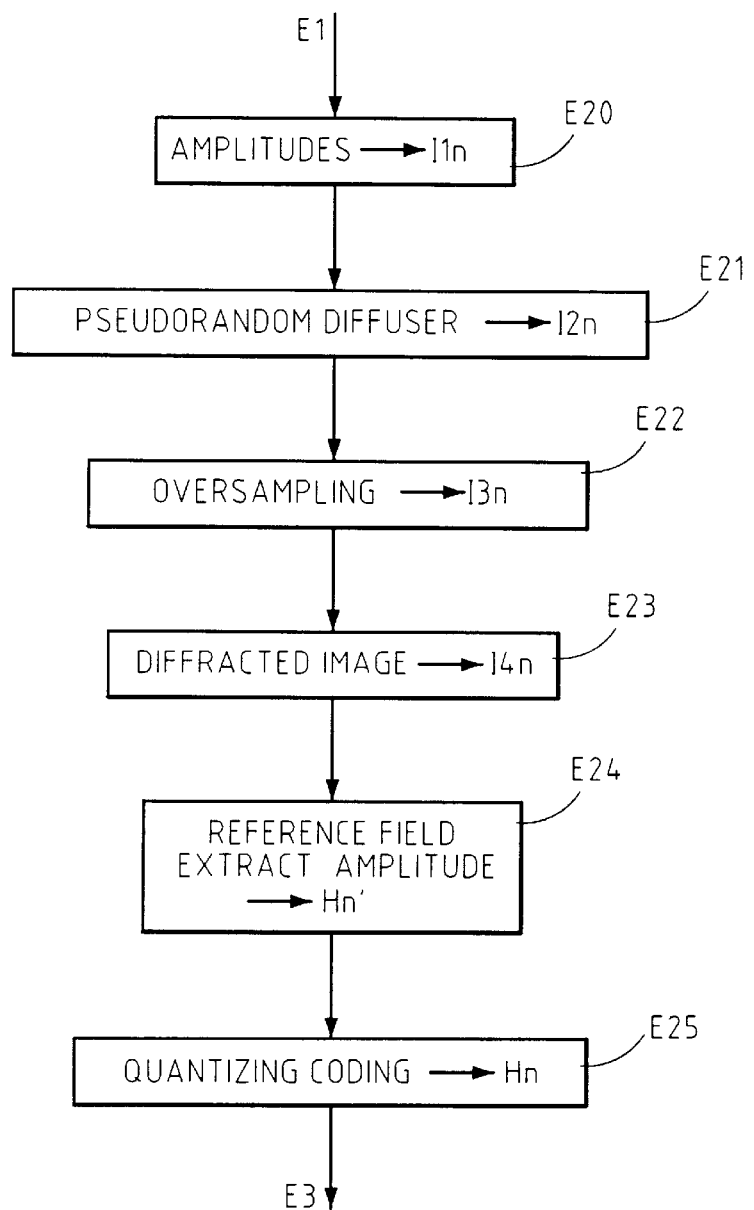
FIG. 5 shows an algorithm used to implement a hologram calculation step in the algorithm shown in FIG. 2.

In a variant of the FIG. 5 algorithm, the sub-steps E20 and E21 of producing the complex image and/or the oversampling sub-step E22 are eliminated. In another variant, the oversampling sub-step E22 is implemented before the sub-steps E20 and E21 of producing the complex image.

Figure 8:
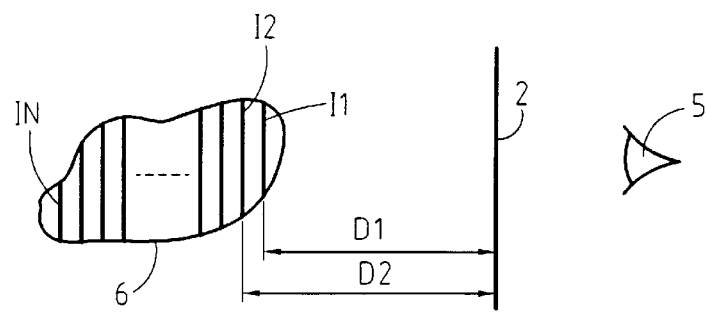
FIG. 8 is a sectional diagram showing the reproduction of a three-dimensional image in accordance with the present invention.

Referring to FIG. 2 again, in a step E3 following on from step E2 the computer 1 controls the spatial light modulator 2 via the driver 3 so as to reproduce the holograms H1 to HN physically on the spatial modulator 2. To be more precise, the holograms H1 to HN are reproduced sequentially in accordance with a predetermined cycle CL (see FIG. 1). During a cycle CL, each hologram Hn is reproduced by the spatial light modulator 2 for a predetermined time period. Illumination of the spatial light modulator 2 by the light source 4 enables reproduction of the corresponding two-dimensional image In at a distance Dn from the spatial light modulator 2 for the predetermined time period. Thus, during a cycle CL, all the two-dimensional images I1 to IN are reproduced sequentially at respective distances D1 to DN from the modulator 2, as shown in FIG. 8. The duration of the cycle is sufficiently short, typically of the order of 50 ms, for the observer 5 to perceive a three-dimensional image corresponding to the image 6 stored in the computer 1 by mental fusion. Note that, because of the hologram calculation technique used by the present invention, which enables a hologram to be calculated at a defined distance, the order in which the holograms H1 to HN are reproduced by the spatial light modulator 2 during a cycle is of relatively little importance.

Also, one consequence of the apparatus of the invention is that the three-dimensional image that the observer 5 perceives is transparent. This feature is extremely advantageous for medical applications, in which it is important to be able to visualize the interior of organs.

Figure 9:
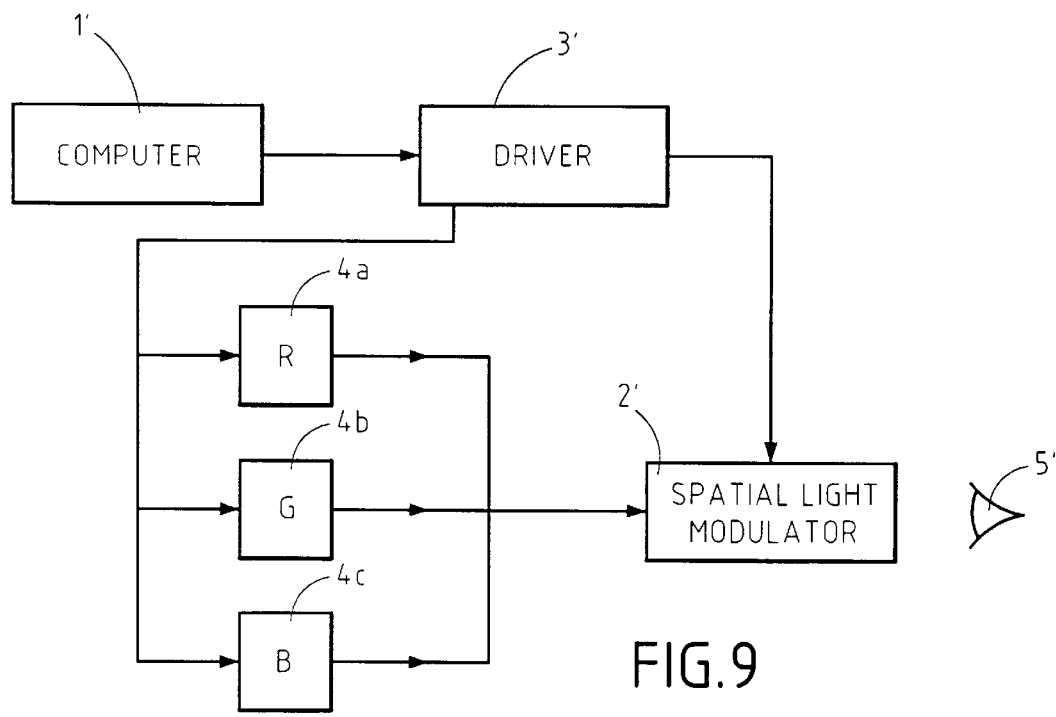
FIG. 9 is a block diagram of a second embodiment of a holographic apparatus of the invention.

FIG. 9 shows a second embodiment of the holographic apparatus of the invention. This embodiment differs from that shown in FIG. 1 in that the light source 4 is replaced by three light sources 4a, 4b and 4c respectively emitting red, green, and blue coherent light.

Figure 10:
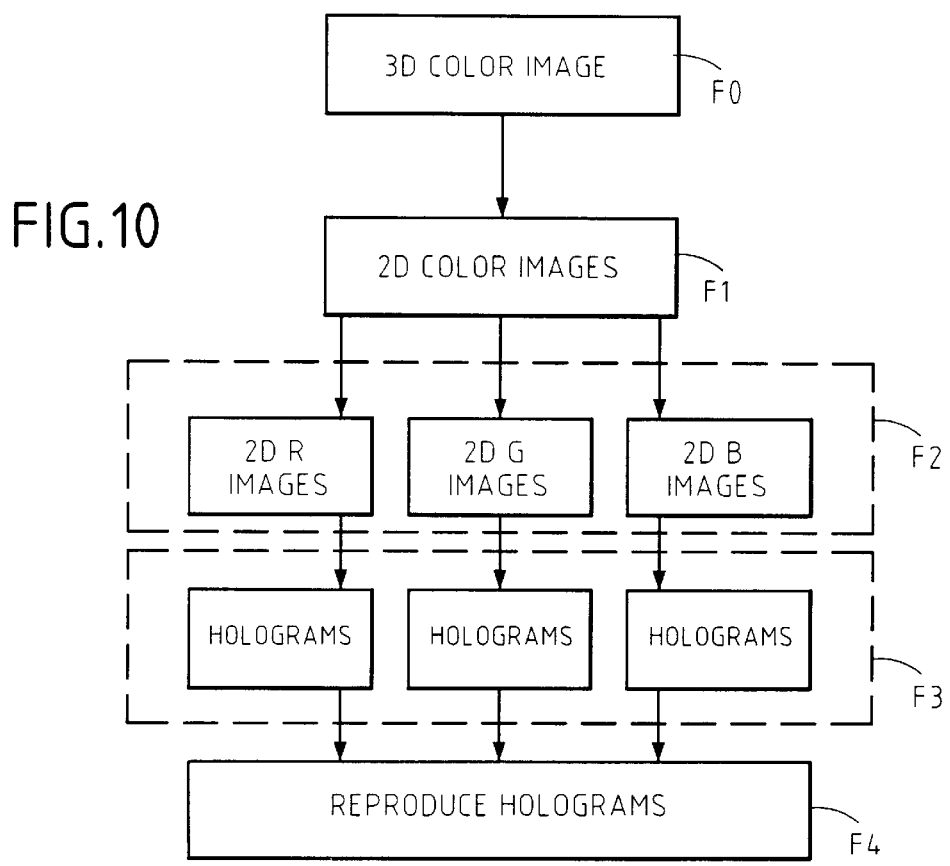
FIG. 10 is a flowchart of a method of reproducing three-dimensional images in color implemented by the apparatus shown in FIG. 9.

FIG. 10 shows a method of reproducing a three-dimensional image in color implemented by the holographic apparatus shown in FIG. 9.

In a preliminary step F0 of the method a three-dimensional image in color is stored in the form of digital data in the computer 1'. The digital data comprises a thermo-optical table, for example a JANA table, which contains in particular the color information of the image. Using the thermo-optical table, each point of the three-dimensional image is associated with thermo-optical colorimetry characteristics that depend on wavelength and define the color of the point for each wavelength.

In a first step F1 the three-dimensional image in color is decomposed into a plurality of two-dimensional images in color, in a manner comparable to step E1 in FIG. 2, i.e. by determining the intersections between the three-dimensional image and an integer number M of parallel planes, where M is greater than 1.

In the next step F2, each two-dimensional image in color obtained in step F1 is decomposed into respective red, green, and blue images, in accordance with the known principles of colorimetry.

In a step F3 respective holograms are produced digitally for the MX3 two-dimensional images obtained in step F2. The hologram associated with a given two-dimensional red, green, or blue image is calculated as described previously with reference to FIG. 5 for the wavelength of the light source 4a, 4b or 4c respectively.

In a step F4, the MX3 holograms generated in step F3 are reproduced physically by the spatial light modulator 2 in a sequential manner and in accordance with a predetermined cycle. During a cycle, M sequences of holograms are reproduced successively, namely:

a first sequence consisting of three holograms corresponding to the two-dimensional red, green, and blue images obtained by decomposing a first two-dimensional image in color in step F2;

a second sequence consisting of three holograms corresponding to the two-dimensional red, green, and blue images obtained by decomposing a second two-dimensional image in color in step F2;

an $M^{th}$ sequence consisting of three holograms corresponding to the two-dimensional red, green, and blue images obtained by decomposing an $M^{th}$ two-dimensional image in color in step F2.

The light sources 4a, 4b and 4c are controlled to emit light in turn, synchronously with the reproduction of the holograms. In particular, the source 4a is activated only when a hologram corresponding to a two-dimensional red image is reproduced and the sources 4b and 4c are respectively activated only when a hologram corresponding to a two-dimensional green image and a hologram corresponding to a two-dimensional blue image are reproduced. The three-dimensional image is thus reproduced in color by time-division multiplexing.

Figure 11:
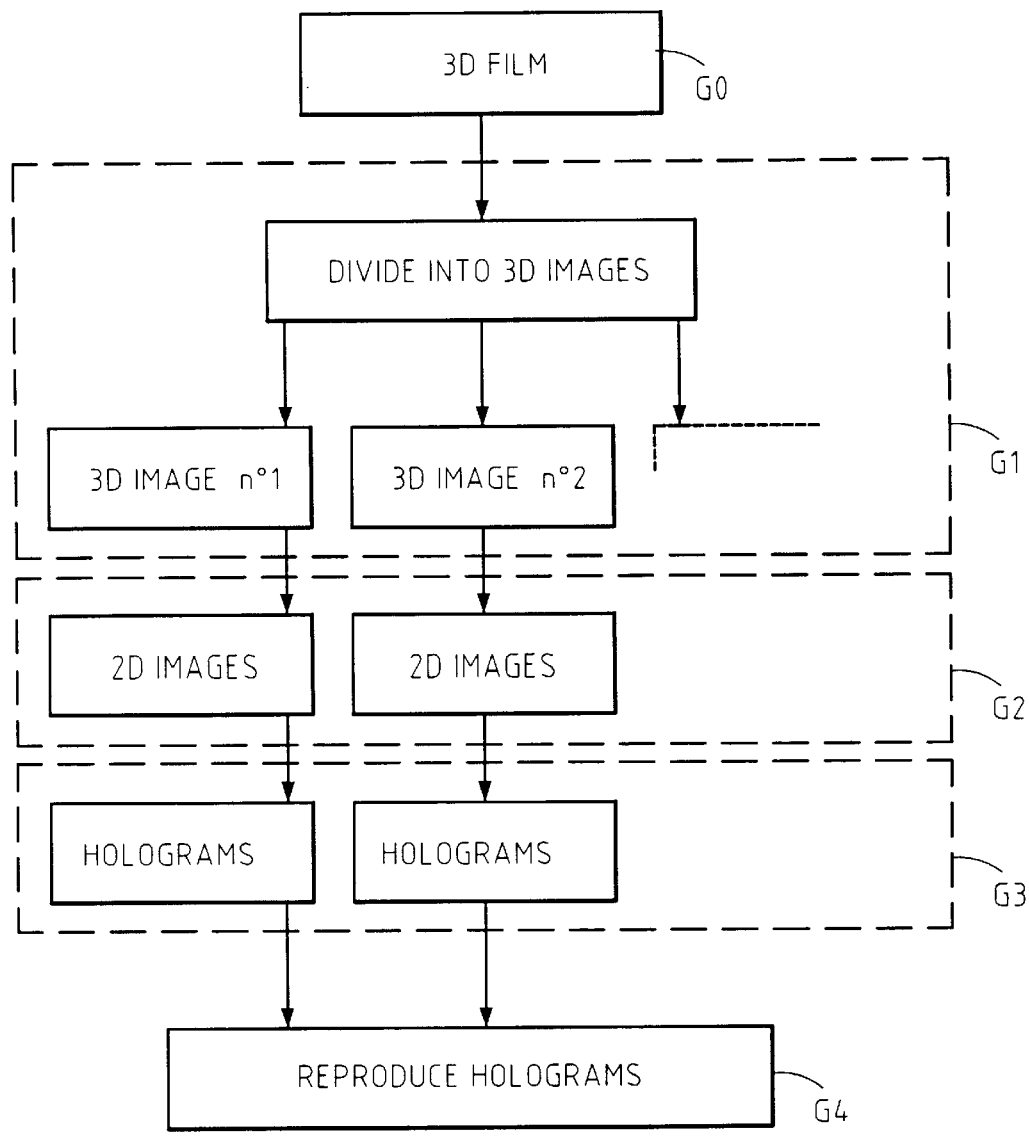
FIG. 11 is a flowchart of a method of reproducing a video film in three dimensions in accordance with the invention.

FIG. 11 shows a method of reproducing a video film in three dimensions in accordance with the present invention. The film in three dimensions is preliminary stored in a memory of the computer in digital data form in a step G0.

In a step G1 the film in three dimensions is divided into a sequence of images in three dimensions. Steps G2 and G3 which perform the same functions as steps E1 and E2 of FIG. 2 or steps F1 to F3 of FIG. 10 (if the film is in color)are then implemented to produce holograms.

In a step G4 these holograms are reproduced by the spatial light modulator in a sequential manner and in accordance with a predetermined image cycle. During an image cycle, the holograms corresponding to a three-dimensional image from the film are reproduced sequentially. Each three-dimensional image of the film is thus reproduced during an image cycle so that the observer can view the animated film in color stored in the computer.

Furthermore, in accordance with the invention, it is possible to reproduce only some parts of the three-dimensional image or the video film stored in the computer, in order to visualize said parts more closely. Thus in the particular application of the invention to the medical field, organs or parts of organs to be viewed can be selected in the digital three-dimensional image. Such selection may be carried out, for example, during the step of generating two-dimensional images, by choosing section planes in the areas of the image to be reproduced.

Another important advantage of the method and the apparatus in accordance with the present invention is the possibility of performing in parallel various digital calculations, for example the hologram calculations in steps E2, F3 and G3, in order to reduce the calculation time.

What is claimed is:

1. A method of reproducing at least a real or virtual portion of a three-dimensional scene, said three-dimensional scene represented by digital data and defined in a three-dimensional geometrical space, said method comprising the following steps:
    calculating a set of two-dimensional images obtained by determining, in the three-dimensional geometrical space, respective intersections between the real or virtual three-dimensional scene and a plurality of section planes,
    calculating a hologram: for each of the two-dimensional images, and
    successively reproducing the holograms of the two-dimensional images on a spatial light modulator illuminated by a light source,
        wherein said two-dimensional images are defined by respective real functions and said step of calculating a hologram for each of the two-dimensional images comprises the following steps for a given two-dimensional image:
    transforming the given two-dimensional image defined by the corresponding real function into a complex two-dimensional image defined by a complex function,
    oversampling the complex image,
    simulating the production of a diffracted image resulting from the diffraction of a light wave by the oversampled complex image,
    adding a complex field representing a reference light wave to the resulting diffracted image, and
    coding values taken by the amplitude of the sum of said complex field and the resulting diffracted image to produce the hologram associated with said given two-dimensional image.

2. A method according to claim 1, wherein said real or virtual three-dimensional scene is a color scene, said method further comprising the step of decomposing each of said two-dimensional images into red, green, and blue two-dimensional images respectively, said step of calculating a hologram for each of the two-dimensional images includes for a given red, green, or blue two-dimensional image, producing a hologram for a wavelength corresponding to the color of the given two-dimensional image, and said step of successively reproducing the holograms including reproducing the holograms of the two-dimensional images successively on said spatial light modulator while the latter is illuminated in turn by coherent red, green and blue light waves respectively as a function of the color for which the hologram reproduced on the spatial light modulator was calculated, and
    wherein the spatial light modulator has a pixel pitch less than 10 $\mu$m and near 1 $\mu$m in at least two different directions.

3. The method according to claim 1, wherein said step of successively reproducing the holograms includes reproducing on the spatial light modulator a sequence consisting of said holograms, said sequence having a duration not exceeding 50 milliseconds.

4. The method according to claim 1, wherein said step of successively reproducing the holograms includes repetitively reproducing on the spatial light modulator a sequence consisting of said holograms, said sequence preferably having a duration not exceeding 50 milliseconds.

5. A method according to claim 1, wherein said light source is a coherent light source emitting at a predetermined wavelength and said holograms of the two-dimensional images are calculated for said wavelength.

6. A method according to claim 1, wherein the spatial light modulator is a liquid crystal screen.

7. A method according to claim 1, wherein said section planes are parallel.

8. A method according to claim 1, wherein the step of calculating a hologram for each of the two-dimensional images includes calculating the holograms of the two-dimensional images in a predetermined plane situated at a finite distance from said plurality of section: planes and preferably parallel thereto.

9. A method of reproducing a three dimensional video film consisting of a sequence of three-dimensional images represented by digital data, wherein said method includes applying the method according to claim 1 to each three-dimensional image of said sequence so that, for each three-dimensional image, holograms corresponding to that image are reproduced successively on a spatial light modulator during a predetermined image cycle.

10. A method of reproducing at least a real or virtual portion of a three-dimensional scene, said three-dimensional scene represented by digital data and defined in a three-dimensional geometrical space, said method comprising the following steps:
    calculating a set of two-dimensional images obtained by determining, in the three-dimensional geometrical space, respective intersections between the real or virtual three-dimensional scene and a plurality of section planes,
    calculating a hologram for each of the two dimensional images, and successively reproducing the holograms of the two-dimensional images on a spatial light modulator illuminated by a light source,
wherein said two-dimensional images are defined by respective real functions and said step of calculating a hologram for each of the two-dimensional images comprises the following steps for a given two-dimensional image:
transforming the given two-dimensional image defined by the corresponding real function into a complex two-dimensional image defined by a complex function,
oversampling the complex image,
simulating the production of a diffracted image resulting from the diffraction of a light wave by the oversampled complex image,
adding a complex field representing a reference light wave to the resulting diffracted image, and
coding values taken by the amplitude of the sum of said complex field and the resulting diffracted image to produce the hologram associated with said given two-dimensional image, and
wherein said simulation step includes calculating a convolution product having two components, associated with the oversampled complex image by applying the transform which is the inverse of a predetermined complex transform to the product of the respective complex transforms of said two components.

11. The method according to claim 10, wherein said real or virtual three-dimensional scene is a color scene, said method further comprising the step of decomposing each of said two-dimensional images into red, green, and blue two-dimensional images respectively, said step of calculating a hologram for each of the two-dimensional images includes for a given red, green, or blue two-dimensional image, producing a hologram for a wavelength corresponding to the color of the given two-dimensional image, and said step of successively reproducing the holograms including reproducing the holograms of the two-dimensional images successively on said spatial light modulator while the latter is illuminated in turn by coherent red, green and blue light waves respectively as a function of the color for which the hologram reproduced on the spatial light modulator was calculated, and
wherein the spatial light modulator has a pixel pitch less than 10 $\mu$m and near 1 $\mu$m in at least two different directions.

12. The method according to claim 10, wherein said step of successively reproducing the holograms includes reproducing on the spatial light modulator a sequence consisting of said holograms, said sequence having a duration not exceeding 50 milliseconds.

13. The method according to claim 10, wherein said step of successively reproducing the holograms includes repetitively reproducing on the spatial light modulator a sequence consisting of said holograms, said sequence preferably having a duration not exceeding 50 milliseconds.

14. A method according to claim 10, wherein said light source is a coherent light source emitting at a predetermined wavelength and said holograms of the two-dimensional images are calculated for said wavelength.

15. A method according to claim 10, wherein the spatial light modulator is a liquid crystal screen.

16. A method according to claim 10, wherein said section planes are parallel.

17. A method according to claim 10, wherein the step of calculating a hologram for each of the two-dimensional images includes calculating the holograms of the two-dimensional images in a predetermined plane situated at a finite distance from said plurality of section planes and preferably parallel thereto.

18. A method of reproducing a three dimensional video film consisting of a sequence of three-dimensional images represented by digital data, wherein said method includes applying the method according to claim 10 to each three-dimensional image of said sequence so that, for each three-dimensional image, holograms corresponding to that image are reproduced successively on a spatial light modulator during a predetermined image cycle.

19. A method of reproducing at least a real or virtual portion of a three-dimensional scene, said three-dimensional scene represented by digital data and defined in a three-dimensional geometrical space, said method comprising the following steps:
calculating a set of two-dimensional images obtained by determining in the three-dimensional geometrical space, respective intersections between the real or virtual three-dimensional scene and a plurality of section planes,
calculating a hologram foe each of the two-dimensional images, and
successively reproducing the holograms of the two-dimensional images on a spatial light modulator illuminated by a light source,
wherein said two-dimensional images are defined by respective real functions and said step of calculating a hologram for each of the two-dimensional images comprises the following steps for a given two-dimensional image:
transforming the given two-dimensional image defined by the corresponding real function into a complex two-dimensional image defined by a complex function,
oversampling the complex image,
simulating the production of a diffracted image resulting from the diffraction of a light wave by the oversampled complex image,
adding a complex field representing a reference light wave to the resulting diffracted image, and
coding values taken by the amplitude of the sum of said complex field and the resulting diffracted image to produce the hologram associated with said given two-dimensional image,
wherein said simulation step consists in calculating a convolution product associated with the oversampled complex image, of two components, by applying the transform which is the inverse of a predetermined complex transform to the product of the respective complex transforms of said two components, and
wherein said predetermined complex transform is one of the following complex transforms: Fourier transform, Paley transform, Walsh transform, Hankel transform, orthogonal polynomial transform, Hadamar transform, Karhunen-Loeve transform, multiresolution discrete wavelet transform, adaptive wavelet transform, and a transform resulting from composing two or more of the above transforms.

20. The method according to claim 19, wherein said real or virtual three-dimensional scene is a color scene, said method further comprising the step of decomposing each of said two-dimensional images into red, green, and blue two-dimensional images respectively, said step of calculating a hologram for each of the two-dimensional images includes for a given red, green, or blue two-dimensional image, producing a hologram for a wavelength corresponding to the color of the given two-dimensional image, and said step of successively reproducing the holograms including reproducing the holograms of the two-dimensional images successively on said spatial light modulator while the latter is illuminated in turn by coherent red, green and blue light waves respectively as a function of the color for which the hologram reproduced on the spatial light modulator was calculated, and wherein the spatial light modulator has a pixel pitch less than 10 $\mu$m and near 1 $\mu$m in at least two different directions.

21. The method according to claim 19, wherein said step of successively reproducing the holograms includes reproducing on the spatial light modulator a sequence consisting of said holograms, said sequence having a duration not exceeding 50 milliseconds.

22. The method according to claim 19, wherein said step of successively reproducing the holograms includes repetitively reproducing on the spatial light modulator a sequence consisting of said holograms, said sequence preferably having a duration not exceeding 50 milliseconds.

23. A method according to claim 19, wherein said light source is a coherent light source emitting at a predetermined wavelength and said holograms of the two-dimensional images are calculated for said wavelength.

24. A method according to claim 19, wherein the spatial light modulator is a liquid crystal screen.

25. A method according to claim 19, wherein said section planes are parallel.

26. A method according to claim 19, wherein the step of calculating a hologram for each of the two-dimensional images includes calculating the holograms of the two-dimensional images in a predetermined plane situated at a finite distance from said plurality of section planes and preferably parallel thereto.

27. A method of reproducing a three dimensional video film consisting of a sequence of three-dimensional images represented by digital data, wherein said method includes applying the method according to claim 19 to each three-dimensional image of said sequence so that, for each three-dimensional image, holograms corresponding to that image are reproduced successively on a spatial light modulator during a predetermined image cycle.

28. Apparatus for reproducing at least a portion of a real or virtual three-dimensional scene, said three-dimensional scene represented by digital data and defined in a three-dimensional geometrical space, said apparatus comprising:

means for storing the three-dimensional scene, means for calculating a set of two-dimensional images obtained by determining in the three-dimensional geometrical space respective intersections between the three-dimensional scene and a plurality of section planes, means for calculating a hologram for each of the two-dimensional images, a spatial light modulator for successively reproducing the holograms of the two-dimensional images, and a light source for illuminating the spatial light modulator during the reproduction thereby of said holograms, wherein said two-dimensional images are defined by respective real functions and said means for calculating a hologram for each of the two-dimensional images comprises:

means for transforming the given two-dimensional image defined by the corresponding real function into a complex two-dimensional image defined by a complex function, means for oversampling the complex image, means for simulating the production of a diffracted image resulting from the diffraction of a light wave by the oversampled complex image, means for adding a complex field representing a reference light wave to the resulting diffracted image, and means for coding values taken by the amplitude of the sum of said complex field and the resulting diffracted image to produce the hologram associated with said given two-dimensional image.

29. The apparatus according to claim 28, wherein said three-dimensional scene is a color scene, said apparatus further comprising means for decomposing each of said two-dimensional images into red, green, and blue two-dimensional images respectively, said means for calculating a hologram for each of the two-dimensional images comprising means for producing, for a given red, green, or blue two-dimensional image, a hologram for a wavelength corresponding to the color of the given two-dimensional image, and said spatial light modulator reproducing the holograms of the two-dimensional images successively while it is illuminated in turn by light sources emitting coherent red, green, and blue light waves respectively as a function of the color for which the hologram reproduced on the spatial light modulator was calculated, and wherein the spatial light modulator has a pixel pitch less than 10 $\mu$m and near 1 $\mu$m in at least two different directions.

30. The apparatus according to claim 28, wherein said spatial light modulator reproduces a sequence consisting of said holograms, said sequence having a duration not exceeding 50 milliseconds.

31. The apparatus according to claim 28, wherein said spatial light modulator repetitively reproduces a sequence consisting of said holograms, said sequence preferably having a duration not exceeding 50 milliseconds.

32. Apparatus according to claim 28, wherein said light source is a coherent light source emitting at a predetermined wavelength and said holograms of the two-dimensional images are calculated for said wavelength.

33. Apparatus according to claim 28 wherein the spatial light modulator is a liquid crystal screen.

34. Apparatus according to claim 28, wherein said section planes are parallel.

35. Apparatus according to claim 28, wherein said means for calculating a hologram for each of the two-dimensional images comprise means for calculating the holograms of the two-dimensional images in a predetermined plane situated at a finite distance from said plurality of section planes and preferably parallel thereto.

36. Apparatus for reproducing at least a portion of a real or virtual three-dimensional scene, said three-dimensional scene being represented by digital data and defined in a three-dimensional geometrical space, said apparatus comprising:

means for storing the three-dimensional scene, means for calculating a set of two-dimensional images obtained by determining in the three-dimensional geometrical space respective intersections between the three-dimensional scene and a plurality of section planes, means for calculating a hologram for each of the two-dimensional images, a spatial light modulator for successively reproducing the holograms of the two-dimensional images, and a light source for illuminating the spatial light modulator during the reproduction thereby of said holograms, wherein said two-dimensional images are defined by respective real functions and said means for calculating a hologram for each of the two-dimensional images comprises:

means for transforming the given two-dimensional image defined by the corresponding real function into a complex two-dimensional image defined by a complex function, means for oversampling the complex image, means for simulating the production of a diffracted image resulting from the diffraction of a light wave by the oversampled complex image, means for adding a complex field representing a reference light wave to the resulting diffracted image, and means for coding values taken by the amplitude of the sum of said complex field and the resulting diffracted image to produce the hologram associated with said given two-dimensional image, and wherein said means for simulating the production of a diffracted image comprises means for calculating a convolution product associated with the oversampled complex image and having two components, by applying the transform which is the inverse of a predetermined complex transform to the product of the respective complex transforms of said two components.

37. The apparatus according to claim 36, wherein said three-dimensional scene is a color scene, said apparatus further comprising means for decomposing each of said two-dimensional images into red, green, and blue two-dimensional images respectively, said means for calculating a hologram for each of the two-dimensional images comprising means for producing, for a given red, green, or blue two-dimensional image, a hologram for a wavelength corresponding to the color of the given two-dimensional image, and said spatial light modulator reproducing the holograms of the two-dimensional images successively while it is illuminated in turn by light sources emitting coherent red, green, and blue light waves respectively as a function of the color for which the hologram reproduced on the spatial light modulator was calculated, and wherein the spatial light modulator has a pixel pitch less than $10 \mu m$ and near $1 \mu m$ in at least two different directions.

38. The apparatus according to claim 36, wherein said spatial light modulator reproduces a sequence consisting of said holograms, said sequence having a duration not exceeding 50 milliseconds.

39. The apparatus according to claim 36, wherein said spatial light modulator repetitively reproduces a sequence consisting of said holograms, said sequence preferably having a duration not exceeding 50 milliseconds.

40. Apparatus according to claim 36, wherein said light source is a coherent light source emitting at a predetermined wavelength and said holograms of the two-dimensional images are calculated for said wavelength.

41. Apparatus according to claim 36, wherein the spatial light modulator is a liquid crystal screen.

42. Apparatus according to claim 36, wherein said section planes are parallel.

43. Apparatus according to claim 36, wherein said means for calculating a hologram for each of the two-dimensional images comprise means for calculating the holograms of the two-dimensional images in a predetermined plane situated at a finite distance from said plurality of section planes and preferably parallel thereto.

44. Apparatus for reproducing at least a portion of a real or virtual three-dimensional scene, said three-dimensional scene being represented by digital data and defined in a three-dimensional geometrical space, said apparatus comprising:

means for storing the three-dimensional scene, means for calculating a set of two-dimensional images obtained by determining in the three-dimensional geometrical space respective intersections between the three-dimensional scene and a plurality of section planes, means for calculating a hologram for each of the two-dimensional images, a spatial light modulator for successively reproducing the holograms of the two-dimensional images, and a light source for illuminating the spatial light modulator during the reproduction thereby of said holograms, wherein said two-dimensional images are defined by respective real functions and said means for calculating a hologram for each of the two-dimensional images comprises:

means for transforming the given two-dimensional image defined by the corresponding real function into a complex two-dimensional image defined by a complex function, means for oversampling the complex image, means for simulating the production of a diffracted image resulting from the diffraction of a light wave by the oversampled complex image, means for adding a complex field representing a reference light wave to the resulting diffracted image, and means for coding values taken by the amplitude of the sum of said complex field and the resulting diffracted image to produce the hologram associated with said given two-dimensional image, wherein said means for simulating the production of a diffracted image comprises means for calculating a convolution product, associated with the oversampled complex image, of two components, by applying the transform which is the inverse of a predetermined complex transform to the product of the respective complex transforms of said two components, and wherein said predetermined complex transform is one of the following complex transforms: Fourier transform, Paley transform, Walsh transform, Hankel transform, orthogonal polynomial transform, Hadamar transform, Karhunen-Loeve transform, multi-resolution discrete wavelet transform, adaptive wavelet transform, and a transform resulting from composing two or more of the above transforms.

45. The apparatus according to claim 44, wherein said three-dimensional scene is a color scene, said apparatus further comprising means for decomposing each of said two-dimensional images into red, green, and blue two-dimensional images respectively, said means for calculating a hologram for each of the two-dimensional images comprising means for producing, for a given red, green, or blue two-dimensional image, a hologram for a wavelength corresponding to the color of the given two-dimensional image, and said spatial light modulator reproducing the holograms of the two-dimensional images successively while it is illuminated in turn by light sources emitting coherent red, green, and blue light waves respectively as a function of the color for which the hologram reproduced on the spatial light modulator was calculated, and wherein the spatial light modulator has a pixel pitch less than 10 µm and near 1 µm in at least two different directions.

46. The apparatus according to claim 44, wherein said spatial light modulator reproduces a sequence consisting of said holograms, said sequence having a duration not exceeding 50 milliseconds.

47. The apparatus according to claim 44, wherein said spatial light modulator repetitively reproduces a sequence consisting of said holograms, said sequence preferably having a duration not exceeding 50 milliseconds.

48. Apparatus according to claim 44, wherein said light source is a coherent light source emitting at a predetermined wavelength and said holograms of the two-dimensional images are calculated for said wavelength.

49. Apparatus according to claim 44 wherein the spatial light modulator is a liquid crystal screen.

50. Apparatus according to claim 44, wherein said section planes are parallel.

51. Apparatus according to claim 44, wherein said means for calculating a hologram for each of the two-dimensional images comprise means for calculating the holograms of the two-dimensional images in a predetermined plane situated at a finite distance from said plurality of section planes and preferably parallel thereto.

* * * * *